United States Patent [19]

Tetenburg

[11] Patent Number: 5,142,816
[45] Date of Patent: Sep. 1, 1992

[54] PLANTING DEVICE AND METHOD OF OPERATING THE SAME

[76] Inventor: William Tetenburg, 20 Marilyn St., Manorville, N.Y. 11949

[21] Appl. No.: 705,113
[22] Filed: May 24, 1991
[51] Int. Cl.⁵ .............................................. A01G 9/08
[52] U.S. Cl. ...................................... 47/1.01; 47/901
[58] Field of Search .............................. 47/1.01, 901

[56] References Cited

U.S. PATENT DOCUMENTS

| | | |
|---|---|---|
| 2,829,468 | 4/1958 | Van Wingerden et al. ......... 47/1.01 |
| 2,869,283 | 1/1959 | Krause .................................... 47/1.01 |
| 3,012,370 | 12/1961 | Lortz et al. ........................... 47/1.01 |
| 3,085,364 | 4/1963 | Chapin et al. ........................ 47/1.01 |
| 3,571,971 | 3/1971 | Broersma .............................. 47/1.01 |
| 4,627,190 | 12/1986 | Little .................................... 47/1.01 |
| 4,998,945 | 3/1991 | Holt et al. ............................ 47/1.01 |

FOREIGN PATENT DOCUMENTS 2144612  3/1985  United Kingdom ................. 47/1 A

*Primary Examiner*—David A. Scherbel
*Assistant Examiner*—Joanne C. Downs
*Attorney, Agent, or Firm*—Michael I. Kroll

[57] ABSTRACT

An improved planting device is provided in a planting machine being of the type having a conveyor carrying a plurality of flat plant trays therealong, with each tray having soil with a plurality of spaced apart planting holes therein. The improved planting device consists of a mechanism for transplanting by water pressure a plurality of root plugs of plants into the planting holes in the soil of each of the trays on the conveyor.

4 Claims, 3 Drawing Sheets

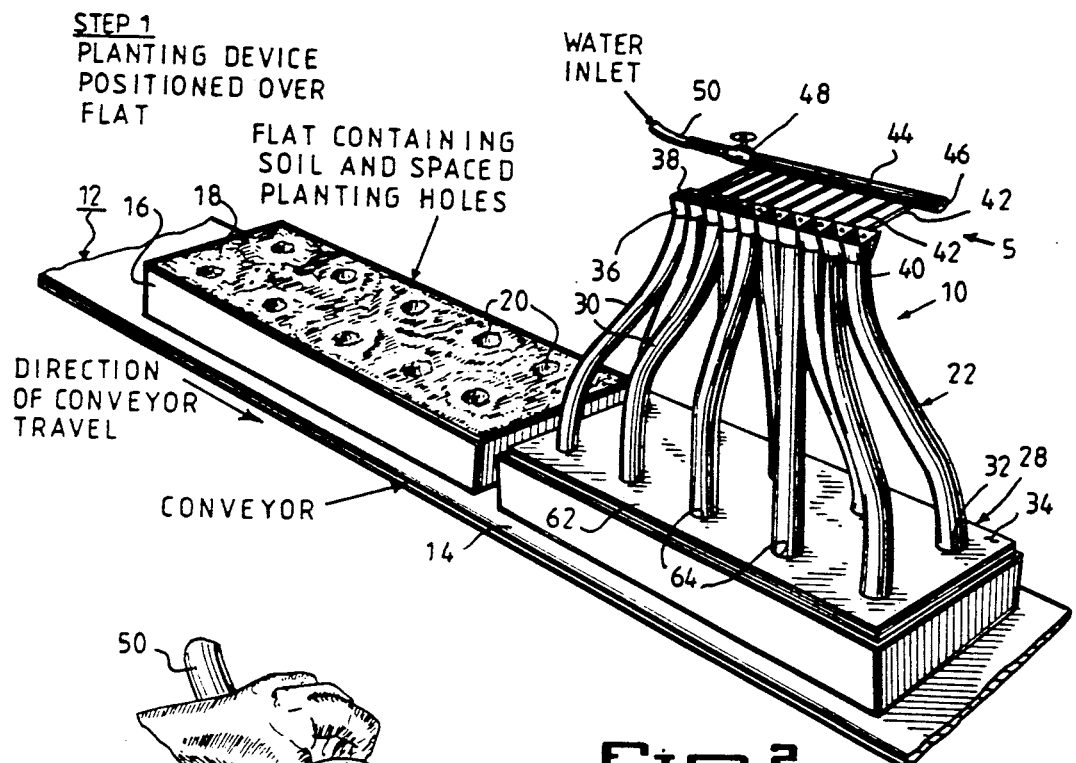
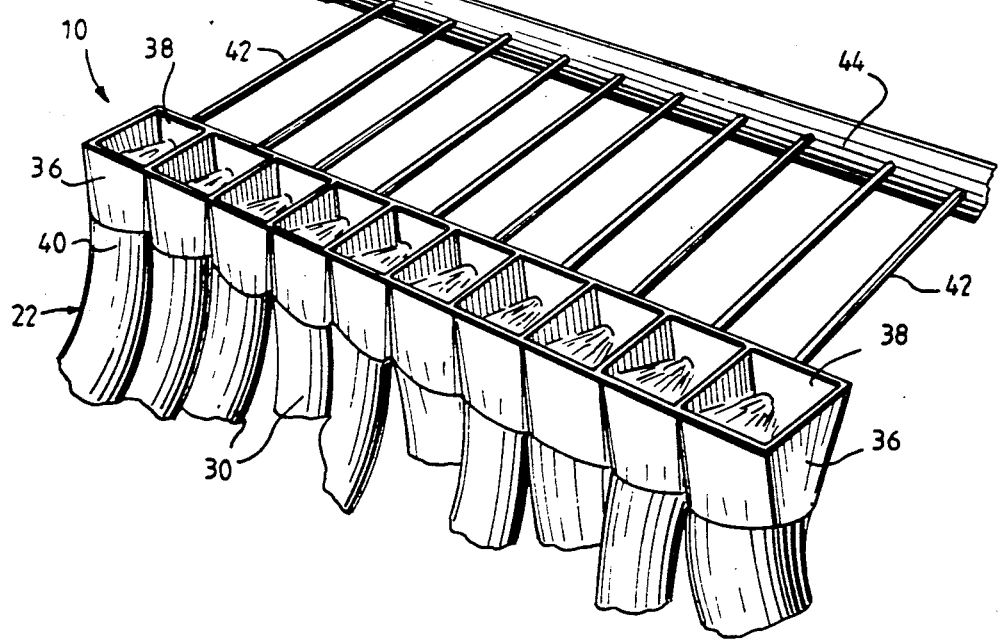

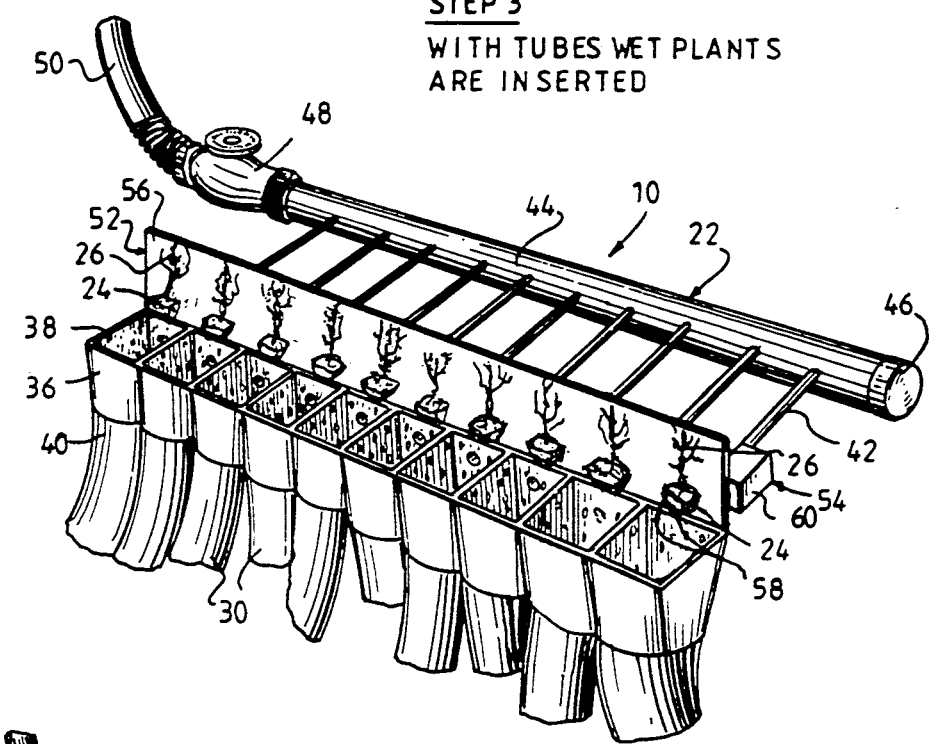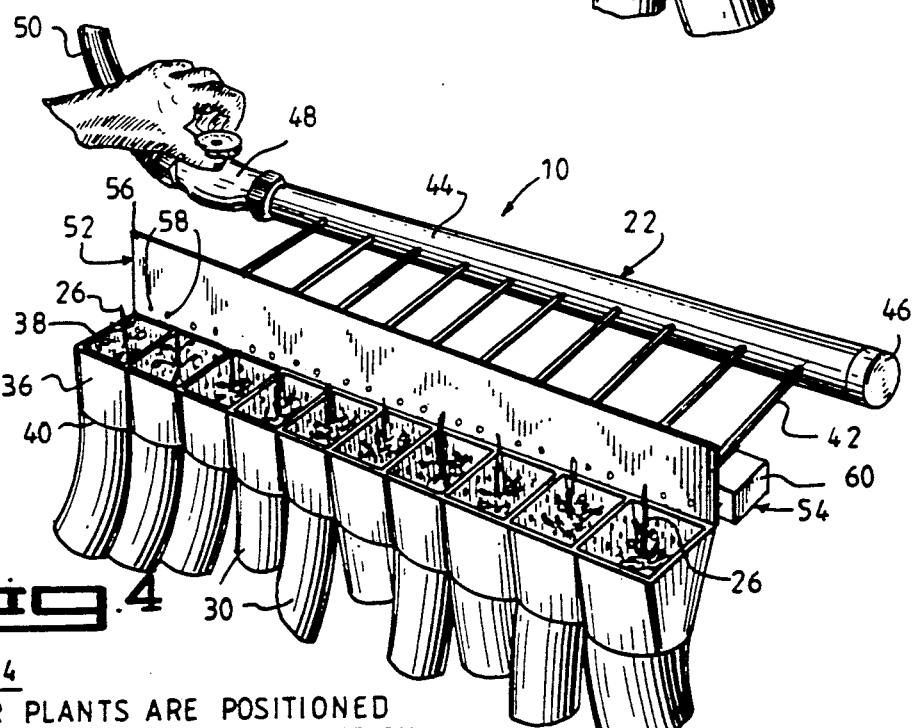

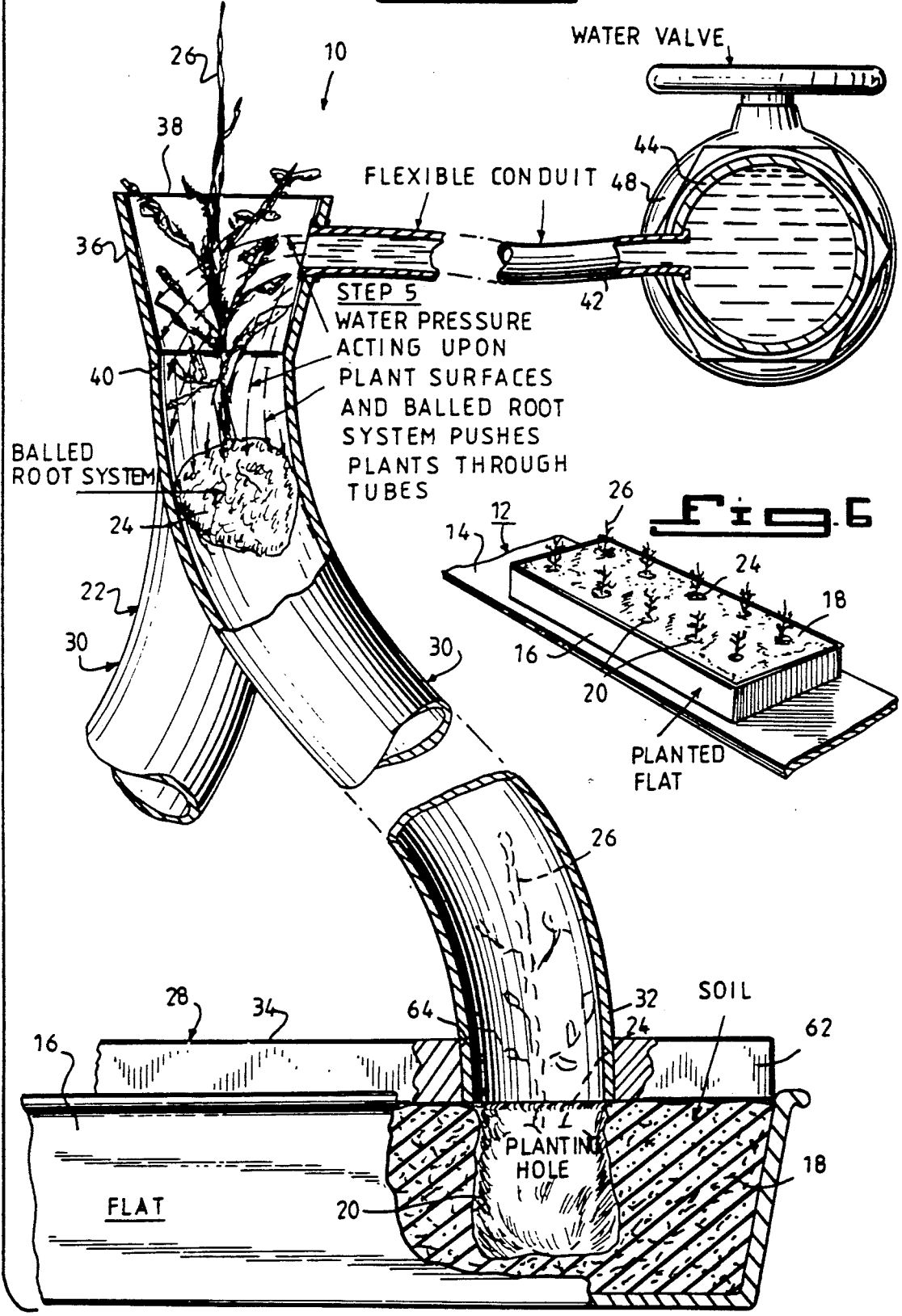

PLANTING DEVICE AND METHOD OF OPERATING THE SAME

BACKGROUND OF THE INVENTION

1. Field of the Invention

The instant invention relates generally to planting machines and more specifically it relates to an improved planting device and method of operating the same.

2. Description of the Prior Art

Numerous planting machines have been provided in prior art that are adapted to insert plants into shallow frames or boxes. While these units may be suitable for the particular purpose to which they address, they would not be as suitable for the purposes of the present invention as heretofore described.

SUMMARY OF THE INVENTION

A primary object of the present invention is to provide an improved planting device and method of operating the same that will overcome the shortcomings of the prior art devices.

Another object is to provide an improved planting device and method of operating the same in which no mechanical equipment is required or needed to accomplish the transplanting of plants into the soil of a flat plant tray.

An additional object is to provide an improved planting device and method of operating the same that eliminates the watering of the plants immediately after the transplanting since the transplanting is accomplished by water pressure.

A further object is to provide an improved planting device and method of operating the same that is simple and easy to use.

A still further object is to provide an improved planting device and method of operating the same that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention showing the first step of operation.

FIG. 2 is a perspective view of the top portion of the instant invention showing the second step of operation.

FIG. 3 is a perspective view similar to FIG. 2 showing the third step of operation.

FIG. 4 is a perspective view similar to FIG. 3 showing the forth step of operation.

FIG. 5 is a side view taken in direction of arrow 5 in FIG. 1, with parts broken away and in section showing one of the root plugs being pushed through one of the tubes by water pressure going into the plating hole in the soil of the flat plant tray.

FIG. 6 is a perspective view of the flat plant tray on the conveyor belt with all of the plants therein.

DETAILED DESCRIPTION OF THE PREFERRED EMBODIMENTS

Turning now descriptively to the drawings, in which similar reference characters denote similar elements throughout the several views, the Figures illustrate an improved planting device 10 in a planting machine 12 being of the type having a conveyor 14 carrying a plurality of flat plant trays 16 therealong, with each tray 16 having soil 18 with a plurality of spaced apart planting holes 20 therein. The improved planting device 10 consists of a mechanism 22 for transplanting by water pressure, a plurality of root plugs 24 of plants 26 into the planting holes 20 in the soil 18 of each of the trays 16 on the conveyor 14. Since the planting machine 12 is not part of the invention and is known in the art only a portion of the conveyor 14 is shown in the drawings.

The transplanting mechanism 22 includes a spading unit 28 disposed over one of the trays 16 on the conveyor 14. A plurality of tubes 30 are provided with each fluidly connected at a bottom end 32 into the top 34 of the spacing unit 28. A plurality of entrance members 36 are aligned together in a row above the spacing unit 28 with each having an open top 38 for receiving one plant 26 with its root plug 24 and is fluidly connected to a top end 40 of one tube 30. A plurality of flexible conduits 42 are each fluidly connected to a side of one entrance member 36, while a distribution pipe 44 is transversely positioned and fluidly connected to all of the flexible conduits 42. A cap 46 is affixed to one end of the distribution pipe 44, while a valve 48 is affixed to the other end of the distribution pipe 44. Water inlet hose 50 is fluidly connected to the valve 48, whereby when the valve 48 is turned on, water under pressure from the inlet hose 50 will enter the distribution pipe 44, travel through all of the flexible conduits 42, go into the entrance members 36 and push the plants 26 with their root plugs 24 down the tubes 30 past the spacing unit 28 into the planting holes 20 in the soil 18 in the tray 16 under the spacing unit 28.

Another mechanism 52 is for positioning the plurality of root plugs 24 of the plants 26 above the entrance members 36 simultaneously so that the root plugs 24 of the plants 26 will drop therein.

The positioning mechanism 52 is a plug gripper 54 that includes an elongated rectangular plate 56 positioned perpendicular along the length of the row of the entrance members 36. A plurality of movable needles 58 are grouped in pairs through the rectangular plate 56 so that each pair of the needles 58 can engage each root plug 24 of the plants 26 and release them over the entrance members 36. A piston 60 is provided to reciprocate the needles 58 through the rectangular plate 56.

The spacing unit 28 is a platform 62 having a plurality of spaced apart apertures 64 therethrough being of the same configuration as the spaced apart planting holes 20 in the soil 18 of one tray 16 so that the bottom ends of the tubes will always be directly over the planting holes 20. The following steps are for operating the improved planting device:

1. Position one flat plant tray 16 having the soil 18 with the spaced apart planting holes 20 on the conveyor 14 under the platform 62.

2. Turn on and then off the valve 48 so that some water is sprayed into the entrance members 36, down the tubes 30 and into the planting holes 20.

3. Insert mechanically the root plugs 24 of the plants 26 into the entrance members 36.

4. Turn on and then off the valve 48 a second time so that water under pressure will push the plants 26 with their root plugs 24 down the tubes 30 past the platform 62 and into the planting holes 20 in the soil 18 in the tray 16.

5. Lift the platform 12 up away from the plant tray 16.

6. Move the conveyor 14 along so that the next plant tray 16 having the soil 18 with the spaced apart planting holes 20 on the conveyor 14 is under the platform 62.

7. Lower the platform 62 down towards the plant tray 16 so that they steps 2 through 4 can be repeated.

LIST OF REFERENCE NUMBERS 10 improved planting device
12 planting machine
14 conveyor of 12
16 flat plant tray
18 soil
20 planting hole in 18
22 transplanting mechanism
24 root plug
26 plant
28 spacing unit
30 tube
32 bottom end of 30
34 top of 28
36 entrance member
38 open top in 36
40 top end of 30
42 flexible conduit
44 distribution pipe
46 cap
48 valve
50 water inlet hose
52 positioning mechanism
54 plug gripper
56 elongated rectangular plate
58 movable needle
60 piston
62 platform
64 aperture in 62

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved planting device in a planting machine being of the type having a conveyor carrying a plurality of flat plant trays therealong, with each tray having soil with a plurality of spaced apart planting holes therein, said improved planting device comprising means for transplanting by water pressure a plurality of root plugs of plants into the planting holes in the soil of each of the trays on the conveyor.

2. An improved planting device as recited in claim 1, further including means for positioning the plurality of root plugs of the plants above said entrance members simultaneously so that the root plugs of the plants will drop therein.

3. An improved planting device as recited in claim 2, wherein said positioning means is a plug gripper that includes:
   a) an elongated rectangular plate positioned perpendicular along the length of the row of said entrance members;
   b) a plurality of movable needles, grouped in pairs through said rectangular plate so that each pair of said needles can engage each root plug of the plants and release them over said entrance members; and
   c) a piston to reciprocate said needles through said rectangular plate.

4. An improved planting device as recited in claim 3, wherein said spacing unit is a platform having a plurality of spaced apart apertures therethrough being of the same configuration as the spaced apart planting holes in the soil of one tray so that the bottom ends of said tubes will always be directly over the planting holes.

* * * * *